Dec. 21, 1954 — A. B. CONROY ET AL — 2,697,452
FLEXIBLE DUCT CONSTRUCTION
Filed July 3, 1952
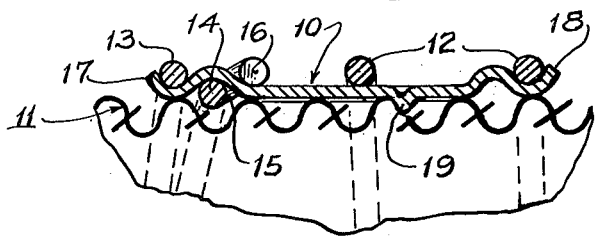
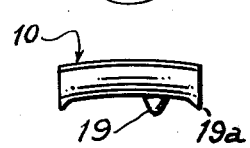
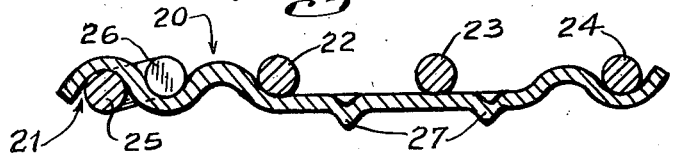
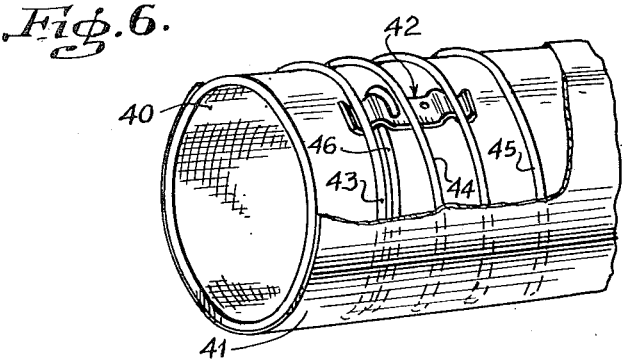
ADDISON B. CONROY
& WILLIAM L. KIMMEL
INVENTORS.
BY Vanderveer Voorhees
ATTORNEY.

United States Patent Office 2,697,452
Patented Dec. 21, 1954

2,697,452

FLEXIBLE DUCT CONSTRUCTION

Addison B. Conroy, Long Beach, and William L. Kimmel, Los Angeles, Calif., assignors to Aeroduct, Incorporated, Southgate, Calif., a corporation of California Application July 3, 1952, Serial No. 297,046

6 Claims. (Cl. 138—56)

This invention relates to flexible ducting and more particularly to ducting which is wound with a cord, wire or other reinforcing strand. Still more particularly the invention relates to a method and a device for locking the ends of said strand in position on the wall of said duct.

One object of the invention is to make a reinforced flexible duct having a spirally wound reinforcing strand firmly locked to the duct wall at the free end thereof, thereby preventing retraction of the end of the strand and resulting bulging of the duct under pressure. Another object of the invention is to lock the end of the reinforcing strand to the duct wall without perforating the wall or producing an objectionable thickening thereof. Still another object of the invention is to effect a secure locking of the end of the reinforcing strand in a quick and simple manner without loss of time in manufacture. Other objects of the invention will become apparent from the following description thereof:

The invention is illustrated by a drawing which shows several embodiments of our locking device. Figure 1 is a side view of the device or clip shown in section in position on the wall of a duct. Figure 2 is an end view of the same clip. Figures 3, 4, and 5 are modified forms and Figure 6 shows the clip of Figure 1 in perspective as it is used to lock the reinforcing wire or strand at the end of a flexible duct.

In the manufacture of flexible ducting it has heretofore been the practice to wind a fabric material on a mandrel using a suitable cementing material such as rubber cement, then apply a reinforcing strand by winding spirally from end to end, spacing the turns sufficiently to give the desired flexibility. The reinforcing strand can be cotton, silk, nylon or rayon cord, plastic filament, etc. but usually it is a metal wire of steel, copper, aluminum, brass, etc. The ends of the strand were usually taped to the duct, then the entire assemblage covered with a final layer of fabric to hold the strand in place.

When such a duct was placed in service, continual flexing often caused the wire to slide near the ends, thus causing a relaxation of the reinforcement and swelling of the duct with eventual failure. Likewise, the sharp end of the wire often wore a hole in the fabric producing a leak. Various means have been tried to overcome this difficulty but without much success. One method involved forming a loop in the end of the wire and taping it to the duct—a time consuming procedure.

We have now discovered that the end of the strand or wire can be effectively retained in position by means of a clip formed of a rigid flat material with a hump under which the end of the wire is passed, then bent backward to form a hook over the clip. When a cord is used it can be fastened by a simple knot or loop over the clip. The clip is sufficiently long to lie along the duct for a short distance where it is held against the duct wall by one or more turns, preferably about two or three turns, of the winding. The details of construction will be more apparent from the drawing.

Referring to Figure 1, the clip 10 is shown lying against the wall of duct 11 shown in cross section. The winding 12 is shown as it would appear in position on the clip and is also shown in cross section along the edge of the clip. The end turn of the wire 13 is crossed back to form the final turn 14, inserted under the clip at 15, then bent sharply back over the clip to form a hook 16. Both ends of the clip are bent outward as shown at 17 and 18 to form grooves for retaining the wire 12. A sharp projection 19 on the underside of the clip is formed by punching and serves to hold the clip in position on the duct wall. If desired, two or more such projections may be provided. We may also knurl or roughen the under side of the clip for the same purpose and when the clip is made by punching in a die, we prefer to place the side with the burr 19a against the duct.

Figure 2 is an end view of clip 10 of Figure 1, showing the slight circumferential curvature of the clip which allows it to lie more closely to the duct wall, giving it a better grip on the duct and providing a smoother finished duct after the final wrapping is applied.

The clip 20 in Figure 3 is a modified form having the retaining groove 21 at the extreme end. Three windings, 22, 23 and 24, bind the clip to the duct and the last turn 25, is passed thru groove 21 and bent back to form hook 26. This form of clip with the retaining groove at the end does not require the winding to be reversed at the last turn. Projections 27 are provided to grip the wall of the duct.

Figure 4 shows a form of clip similar to that of Figure 3 but corrugated thruout its length to provide grooves spaced for any desired winding spacing. The last turn of the winding 28 is passed under the retaining groove and bent back to form hook 29.

Figure 5 shows a constuction wherein the clip is folded from a thinner sheet material providing a loop 30 at the fold into which the end of the winding is inserted and bent to form hook 31. Hump 32 serves to hold winding 33 in place and the end of the clip is bent outward at 34 to keep winding 35 from slipping off. One or more additional turns 36 may be passed over the clip to further bind it to the duct.

The clips shown in Figures 4 and 5 can be provided with gripping means as described with Figure 1. Similarly the clips of Figures 3, 4 and 5 are preferably curved to fit the contour of the duct as in Figure 2.

We can make any of these forms easily by stamping from sheet metal, preferably from a strip. Gripping points 19 and 27 can be formed simultaneously in the stamping operation or later in a separate operation. Instead of using flat metal or other sheet material, we can make our clips from wire, preferably in the form of a hairpin which is stamped to form the desired humps and grooves. The wire can also be partially flattened in the stamping operation if desired.

Figure 6 shows in perspective the manner of applying the clip of Figure 1 to a duct 40. The final wrapping 41 is cut away to show the clip 42 in position on the duct wall. Windings 43, 44 and 45 pass over the clip while the last turn 46 passes under the clip and is bent back into a hook which lies flat on the surface of the clip. The maximum thickness of the assembly is therefore only the thickness of the winding plus the thickness of the clip, and when covered with the final wrapping, the locked end of the winding is scarcely noticeable and does not interfere with any of the uses of the duct.

Ducts of this type are largely used in conducting heated air and other gases in airplanes, automobiles, busses, trucks, etc. They may be plain or corrugated for increased flexibility. They are commonly built on a mandrel from layers of fabric usually cut on the bias to permit corrugating. The fabric, such as cotton or rayon, is generally impregnated or coated with rubber, neoprene, or other synthetic elastomer such as buna-N rubber and applied in a plurality of layers, generally in a spiral winding. The reinforcing strand of wire or cord is then applied and held in position by a final wrapping or by a rubberized tape. The ends of the strand are fastened with the clips as above described before the final wrap is applied. The duct is then vulcanized, usually after removing from the mandrel, altho it may be given a partial cure before the reinforcing strand and final cover are applied after which it is finally vulcanized. An extra wrap may be applied at the ends if desired, covering the ends of the reinforcing strand and providing a heavier wall for attachment to pipes or other equipment. We may also construct our ducts of glass fibre fabric impregnated and cemented with silicone rubber for high temperature applications of 400 to 500° F.

We have described our invention by means of specific embodiments thereof but we do not intend to be limited thereby. Thus we may employ a construction of the clip wherein a longitudinal section is cut and pressed outward to retain the end of the reinforcing strand. Other modifications will be included in the following claims.

We claim:
1. In a flexible duct, a fabric body, a reinforcing strand wound around said body having its turns spaced apart to provide flexibility in said duct and means for fastening the end of said strand which comprises a corrugated, rigid clip bound to the wall of said duct extending longitudinally of said duct sufficient to engage at least two turns of said strand, a circumferential passage confined between said clip and the duct wall thru which the end of said strand is passed, a hook on the end of said strand engaging said clip lying flat against the duct wall, said clip being bound to said duct by at least one turn of said strand, and a flexible cover layer overlying said clip and strand.

2. The duct of claim 1 wherein said clip is turned outward at the end to better retain said binding strand.

3. The duct of claim 1 wherein said clip is provided with sharp projections engaging the wall of said duct to prevent slipping.

4. The clip of claim 1 wherein both ends are turned outward to retain the said winding turns.

5. The clip of claim 1 wherein said clip is curved to conform to the contour of the duct wall.

6. The clip of claim 1 wherein a burr formed at the edge of the metal by shearing is placed against the wall of said duct to provide an anchorage for said clip.

References Cited in the file of this patent

UNITED STATES PATENTS

| Number | Name | Date |
| --- | --- | --- |
| 607,153 | Woodward | July 12, 1898 |
| 1,155,460 | Barbour | Oct. 5, 1915 |
| 2,185,741 | Sorg et al. | Jan. 2, 1940 |
| 2,584,501 | Roberts | Feb. 5, 1952 |
| 2,627,378 | Hirsh | Feb. 3, 1953 |

FOREIGN PATENTS

| Number | Country | Date |
| --- | --- | --- |
| 534,624 | Great Britain | Mar. 12, 1941 |